United States Patent
Zitkovic, Jr.

(10) Patent No.: US 6,832,785 B1
(45) Date of Patent: Dec. 21, 2004

(54) SPIN WELDED FLUID COUPLING

(75) Inventor: Michael T. Zitkovic, Jr., Auburn Hills, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/624,036

(22) Filed: Jul. 21, 2003

(51) Int. Cl.$^7$ .............................................. F16L 13/14
(52) U.S. Cl. .................. 285/21.1; 285/331; 285/288.1; 285/285.1; 156/73.5
(58) Field of Search ............................. 285/331, 285.1, 285/21.1, 288.1; 428/60; 156/304.2, 30, 73.5; 228/112.1, 114.5

(56) References Cited

U.S. PATENT DOCUMENTS

| | | | |
|---|---|---|---|
| 3,144,710 A | * 8/1964 | Camps-Campins et al. | 228/114.5 |
| 3,788,928 A | * 1/1974 | Wise | 156/294 |
| 4,047,739 A | * 9/1977 | Aitken | 285/21.1 |
| 4,165,104 A | * 8/1979 | van den Beld | 285/21.1 |
| 4,533,063 A | * 8/1985 | Buchner et al. | 220/270 |
| 4,579,242 A | * 4/1986 | Ellis, III | 220/4.13 |
| 4,702,790 A | * 10/1987 | Hogh et al. | 156/293 |
| 4,712,706 A | * 12/1987 | Nakata et al. | 220/276 |
| 4,784,409 A | * 11/1988 | Piechowiak | 285/21.1 |
| 4,892,227 A | 1/1990 | MacLaughlin | 220/450 |
| 4,919,987 A | * 4/1990 | Manner | 428/60 |
| 5,152,855 A | 10/1992 | Jansman et al. | 156/73.5 |
| 5,426,791 A | * 6/1995 | Sydor et al. | 2/255 |
| 5,542,716 A | 8/1996 | Szabo et al. | 285/305 |
| 5,590,691 A | 1/1997 | Iorio et al. | 138/146 |
| 5,636,875 A | 6/1997 | Wasser | 285/21.1 |
| 5,670,108 A | * 9/1997 | Kern et al. | 264/248 |
| 5,730,481 A | 3/1998 | Szabo et al. | 285/305 |
| 5,752,725 A | * 5/1998 | El-Sobky | 285/21.1 |
| 5,782,502 A | 7/1998 | Lewis | 285/87 |
| 5,863,077 A | 1/1999 | Szabo et al. | 285/3 |
| 5,951,063 A | 9/1999 | Szabo | 285/303 |
| 5,992,898 A | 11/1999 | Saylor | 285/55 |
| 6,131,954 A | 10/2000 | Campbell | 285/21.1 |
| 6,199,916 B1 | 3/2001 | Klinger et al. | 285/288.1 |
| 6,453,941 B1 | * 9/2002 | Milhas et al. | 137/515 |
| 6,588,970 B1 | * 7/2003 | Natrop | 403/270 |
| 6,733,047 B1 | * 5/2004 | Stieler | 285/319 |

FOREIGN PATENT DOCUMENTS

| | | | | |
|---|---|---|---|---|
| CH | 0392170 | * | 9/1965 | ................ 285/331 |
| DE | 3903 551 A1 | | 2/1989 | |
| FR | 2 737 548 | | 7/1995 | |
| JP | 61 233292 | | 10/1986 | |
| JP | 62 9937 | | 1/1987 | |
| JP | 404004389 | * | 1/1992 | ................ 285/331 |
| NL | 7011090 | | 1/1972 | |
| WO | WO 94/15137 | | 7/1994 | |
| WO | WO 94/24477 | | 10/1994 | |
| WO | WO 97/17188 | | 5/1997 | |
| WO | WO 02/02978 A2 | | 1/2002 | |

* cited by examiner

Primary Examiner—Eric K. Nicholson
(74) Attorney, Agent, or Firm—Young & Basile, P.C.

(57) ABSTRACT

A fluid coupling between a fluid carrying first component and a second fluid carrying endform is formed by spin welding induced by a bonding material disposed in a recess in the first component which is spin weld compatible with the materials of the first and second component to spin weld join the first and second components together.

7 Claims, 2 Drawing Sheets

US 6,832,785 B1

SPIN WELDED FLUID COUPLING

BACKGROUND

The present invention relates to fluid connectors and, more particularly, to the sealing interconnection of such connectors with tubing end forms and, more particularly still, the use of spin welding to effect such interconnection.

Quick connect couplings have been widely used in the U.S. Automobile industry for many years. Although applicable in numerous applications, quick connectors are typically employer in fuel system and vapor recovery systems. The simplest and most cost effective design is the plastic housing female type quick connector releasably mated to a metal male tube endform. The opposite end of the female housing most typically defines a stem having a member of axially spaced barbs formed on the outer circumferential surface thereof and a nylon or plastic tubing endform pressed there over. Such an arrangement is described in U.S. Pat. No. 5,542,712.

In fluid handling systems, it is imperative that the connectors used have male and female portions properly coupled together. A faulty connector enables an associated system to leak fluid. This can be particularly disadvantageous when the system is under pressure and the leaking connector expels the pressurized fluid. Furthermore, recent Federal legislation has mandated significantly reduced hydrocarbon emissions from automotive fuel and vapor recovery systems. Conventional quick connectors, although effective to mechanically maintain tubing endforms in assembly with their associated connector bodies, have not adequately addressed the federal requirements. Also, the materials employed, typically nylon 12, do not provide sufficient resistance to the permeation of hydrocarbons therethrough.

The permeation problem been addressed in part through the development of co-extruded multi-layer plastic tube containing two or more discrete layers of different types or formulations of plastic, one of which is specifically designed to provide an effective permeation layer, blocking the escape of hydrocarbons from the system. In general, the most successful multi-layer tubing employs a relatively thick outer layer composed of a material resistant to the exterior environment. The innermost layer is thinner and is composed of a material which is chosen for its ability to block defusion of materials, such as hydrocarbons, alcohols and other materials present in fuel blends, to the outer layer and may have a degree of electrical conductivity sufficient to dissipate static charges generated by the flow of fluid therein. To date, it has been extremely difficult to obtain satisfactory lamination characteristics between dissimilar polymer layers. Thus, the use of one or more intermediate layers for bonding the inner and outer layers has been proposed.

The use of multi-layer tubing in fuel related applications has been problematic inasmuch as the tubing endform necessarily exposes the lamina ends of the inner and outer layers as well as any intermediate layers to either the system fuels and vapors or the equally harsh exterior environment. Such exposure tends to degrade the bonding between the various layers, causing delamination or separation of the layers, resulting in loss of system integrity, fuel contamination and even blockage of fluid flow.

A related problem stems from dual aspects of commercially available quick connect devices, to wit: high volume and low sale price frequently necessitating the use of inexpensive, somewhat pliable materials, and complex contours of extremely small inter-fitting components. These aspects collectively increase the likelihood of misassembly. High volume production techniques, including automated assembly tends to aggravate the problem wherein misassembly or impermissible dimensional variations of the components is difficult to detect. Excessive dimensional tolerance stack-up can result in low pull-apart characteristics between the barbed stem and the plastic tube and produce leakage. Misassembly, such as failure to include a 0-ring, can also result in leakage. In the case of multi-layer tubes, dimensional and/or adhesive problems can result in mechanical delamination upon insertion of the tube over the barbed stem. Finally, mono-wall plastic tube or multi-layer structures with low hoop strength can relax over time or at elevated temperatures, resulting in leaking or weeping of fluid.

To create a secure spin weld between a housing and an endform or tube, it is necessary that the housing or connector and the tube be of compatible materials. This has proven difficult where the connector is formed of a plastic and the tube of metal as well as situations where the connector housing is formed of metal and the tube of plastic. While attempts have been made to adhesively join a connector housing and a tubular endform where the tubular housing and the endform are formed of dissimilar materials, it is believed that further improvements can be made to fluidic couplings to ensure a secure, leak free, spin weld in a multi-part fluid coupling where the coupling components are formed of dissimilar materials not normally suited for spin welding.

SUMMARY

The present invention is a spin welded fluid coupling which provides a spin weld join between first and second fluid carrying components.

In one aspect, the present invention is a method of forming a fluid coupling between first and second fluid carrying components. The method comprises the steps of forming an open ended, annular recess in one end of the first component, fixing a bonding material on a surface of the first recess in the spin weld compatible with the material of the first and second components, inserting the second component into the recess in the first component, and spin welding the first and second components causing the bonding material to sealingly join the first component to the second component.

In another aspect, the present invention is a fluid coupling formed of spin weld joined first and second fluid carrying components. The coupling includes a first component formed of a body having a through bore extending from a first end, a second component having a through bore extending from a first end, an open ended recess extending from the first end of the first component, a spin weld inducing bonding material layer disposed on at least one surface of the recess in the first component in the recess to spin weld join the first component to the second component.

The spin weld fluid coupling and method of making the same of the present invention provides a spin weld coupling between two fluid carrying components which uniquely enables the use of materials forming the first and second components which were previously too dissimilar to allow spin welding, to be spin welded together in a secure, leak-free joint. The unique use of a bonding material spin weld compatible with the materials forming the first and second components at the interface between the first and second components induces the spin weld between the dissimilar materials forming the first and second components despite the dissimilar materials.

The bonding material may be varied so as to be compatible with many different types of materials forming the first and second components to enable a metal endform, a plastic coated metal endform, or a plastic endform to be spin welded to a connector body or component formed of a plastic or a completely dissimilar material.

BRIEF DESCRIPTION OF THE DRAWING

The various features, advantages, and other uses of the present invention will become more apparent by referring to the following detailed description and drawing in which.

DETAILED DESCRIPTION

Figure 1:
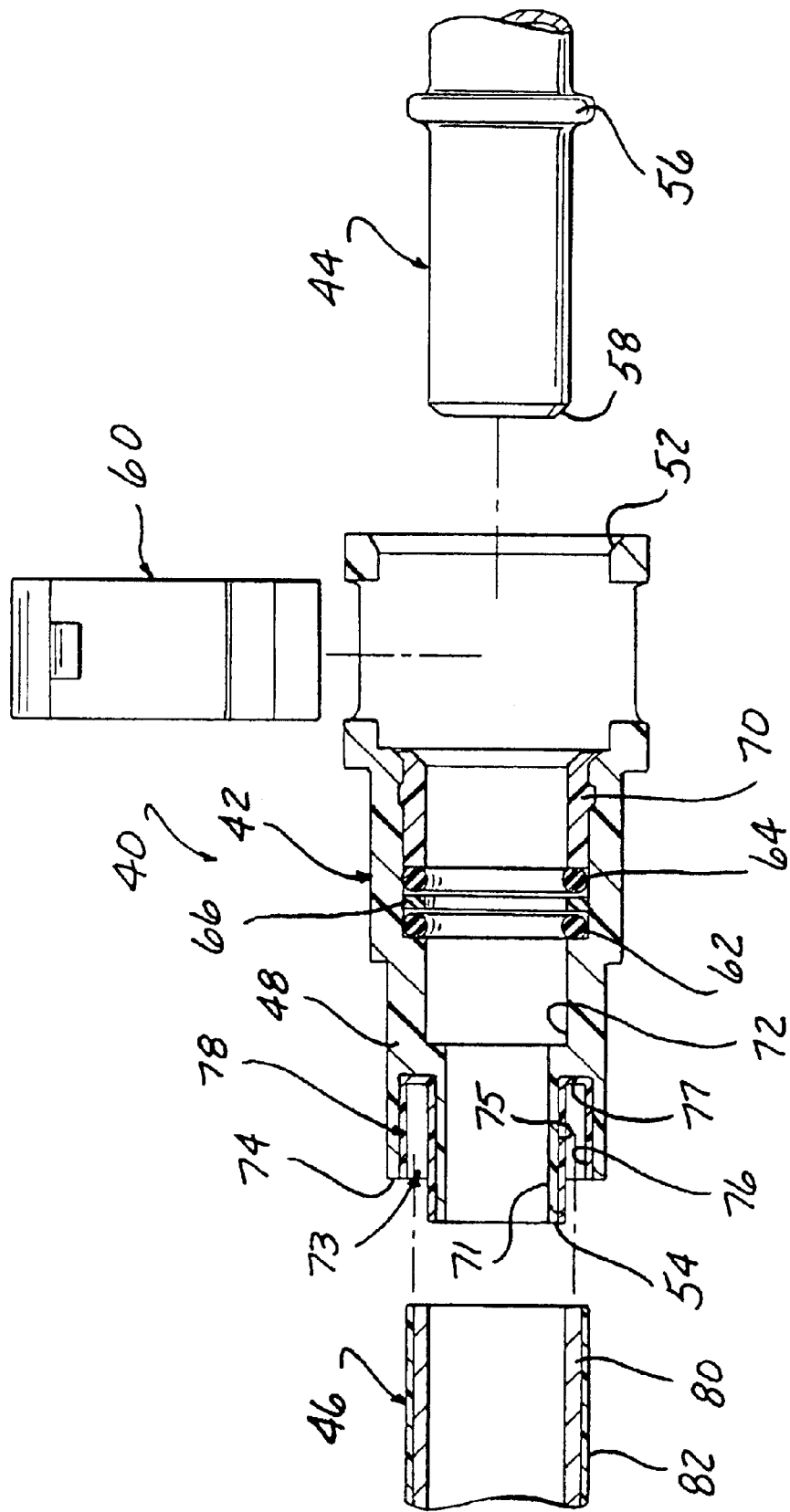
FIG. 1 is an exploded cross-sectional view of one aspect of a spin welded fluid coupling of the present invention.
Figure 2:
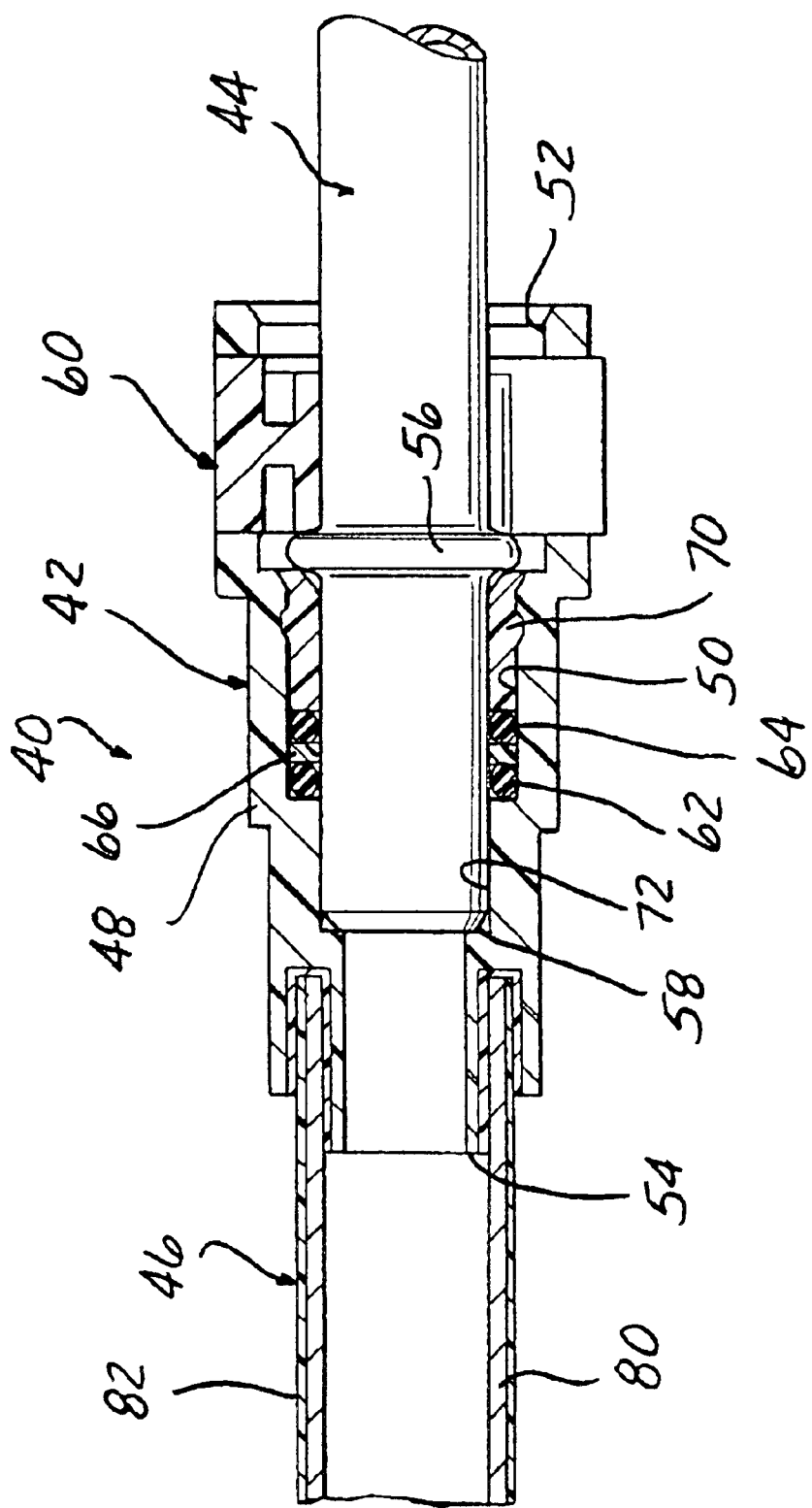
FIG. 2 is a longitudinal, cross-sectional view of the assembled fluid coupling shown in FIG. 1.

Referring to FIGS. 1 and 2, one aspect of the present invention is illustrated in an application comprising a quick connector assembly or fluid coupling 40 in which a connector 42 serves to interconnect a metal tubing member end form 44 and a plastic or metal tube end form 46 to effect a fluidic circuit, preferably for automotive applications.

It will be understood that the fluid coupling 40 uses the illustrated connector 42 by way of example only. The fluid coupling 40 could also be embodied in a port or extension of a fluid operative element, such as a valve, fluidic manifold, automotive brake cylinder, etc., designed for fluidic connection to an endform on a tube or conduit. Alternately, the fluidic coupling of the present invention may be embodied in an endform attached to a fluid operative element, such as a valve, fluidic manifold or automotive brake cylinder which is to be joined to a connector housing, such as the housing of the connector 42 described hereafter.

The connector 42 is an assembly of a hard shell plastic connector body 48 formed of glass filled nylon or other suitable material in a generally tubular form having a stepped bore 50 extending therethrough from a first opening 52 to a second opening 54.

The metal or plastic tubing member end form 44 extends through the first opening 52 into the bore 50 as shown in FIGS. 1 and 2. An upset bead 56, axially off set from a leading end 58 of the tube 44, releasable engages a retainer 60 which is in assembly with the body 48. The outer peripheral surface of the tube 44 is sealingly engaged with the body 48 within the bore 50 by first and second resilient O-rings 62 and 64 separated by a spacer 66 and held in the illustrated position by a top hat 70. As illustrated, the leading end 58 of the metal tube end form 44 can be inserted within the bore 50 and mechanically engage the connector 42. The tube 44 can be released from the connector 42 by displacing the retainer 60.

An intermediate step portion 72 of the bore 50 in the connector body 48 is dimensioned to ensure a slip fit with the leading end 58 of the metal tube 44 to establish intimate contact therewith. A small end bore 74 extends axially from the step 72 to the end 54 of the body 48.

An annular recess 73 is formed in the end 54 of the connector 42 to form a concentric outer end 74 radially spaced outward from the end 54. The outer end 74 may be coplanar with the end 54 or axially offset as shown in FIGS. 1 and 2 by way of example only. The recess 73 forms an annular groove or open ended slot between the ends 54 and 74 of the connector 42 formed of a radially inner recess surface 75, a radially outer recess surface 76 and an inner end wall 77.

At least one and, optionally, all three of the radially inner recess surface 75, the radially outer recess surface 76 and the inner end wall 77 are covered with a bonding material layer 78 which is spin weld compatible with both of the materials on the outer surface of the endform 46 and the connector housing 48. For example, SANOPRENE may be employed as a spin weld inducing bonding material.

The bonding material 78 is applied to the surfaces 75 and 76 and the end wall 77 by suitable means, which may include double shot injection molding during injection molding of the connector housing 48. The double shot injection molding process insures that all of the surfaces 75, 76 and 77 are covered with the bonding material 78.

Alternately, the bonding material 78 may be inserted into the recess 70 by other techniques. In one aspect, the bonding material 78 may be fixtured in a loose form on any or all the surfaces 75, 76, and 77. During the spinwelding of the endform 46 relative to the connector body 42, the loose bonding material 78 melts and then solidifies to fuse the elements together.

In another aspect, the bonding material 78 my be inserted into the recess 73 in a separate step between the tube and endform 76 and the connector body 42. The bonding material is then fused in a fixed position in the recess 78 by a spin friction or ultrasonic welding, prior to the subsequent insertion of the The bonding material 78 is applied to the surfaces 75, 76 and 77 in a thickness to form an opening between opposed surfaces of the bonding material 78 in the recess 73 which is capable of easily receiving the sidewall thickness of the endform 48, regardless of whether the sidewall of the endform 48 is formed of one or more material layers, such as a plastic coated metal sidewall.

The plastic or metal tube endform 46 can be formed of a metal tube or conduit having a metal sidewall 80 which is covered by a plastic material outer layer 82. The plastic outer layer 82 is securely affixed to the metal sidewall by means of co-extrusion and other well-known joining techniques.

One particular plastic and metal 4 tubule endform 6 which is ideally suited for use in the present invention is a nylon 12-carbon steel endform manufactured and sold by the assignee of the present invention under the trade name "NYCLAD." It will be understood that other types of metal as well as other plastic materials may be employed to form the endform 46.

For example, one multi-layered in form 46 may include a fluoropoylmer inter-layer, a NYLON outer-layer and an intermediate adhesive such as a Admer adhesive to bond the two layers together. The same adhesive may be used as a compatibilizer or as a spinweld inducing material 78 applied to the inner services of the recess 73.

Alternately, the compatibilizer or spinweld inducing bonding material may be a NYLON 6/12 disposed on the surfaces, 75, 76 and/or 77 in the recess 73 between a NYLON 12 fluid connector and a NYLON 6 tube or endform. The connector can alternately be formed of NYLON 6 and the tube or endform formed of NYLON 12, with the same NYLON 6/12 compatibilizer.

Although the plastic outer layer 82 of the 46 tube endform has been illustrated as being a mono-wall layer with an outer protective coating layer, it will be understood that a multi-layer, sidewall construction of different plastic layers affixedly joined to each other and to the metal tube 80 or at least two plastic layers with an intermediate conductive material layer may also be employed for the endform 46.

The innermost corner of the leading edge of the connector body 42 may also be beveled or angled to provide a lead-in feature to enhance the insertion of the tube endform 46 into the recess 73 on the connector body 42.

Referring to FIG. 2, the spin welding process of joining the plastic and metal end form 46 on the connector body 48 is illustrated. As shown in FIG. 2, the endform 46 is pre-positioned concentrically with the recess 73.

The tube endform 46 may be mounted rigidly and the connector body 48 mounted for relative rotation therewith in a suitable press, for example. Once a suitable speed differential is established, the tube endform 46 and the connector body 48 are axially pressed together until the leading edge of the tube endform 46 contacts the end wall 77 of the recess 73 at which time all relative axial and rotational displacement ceases.

The various control parameters in spin welding are generally well known, albeit in other applications. For the sake of brevity such parameters will not be repeated here, reference being made to U.S. Pat. Nos. 2,933,428; 3,980,248 and 5,152,855.

During the spin welding process, the outer surface of the outer layer 82 of the tube endform 46 frictionally engages the radially inner and radially outer surfaces of the recess 73 in the body 48 to melt the surfaces thereof to establish a weldment zone.

In conclusion, there has been disclosed a unique fluid coupling which uses a bonding material which is spin weld compatible with the materials of the endform and the connector body to ensure a sealed, leak free connection between the endform and the connector body. The unique quick connector and fluid coupling according to the present invention enable a metal plastic coated metal or a plastic tube to be sealingly joined to a plastic connector body via a spin welding process which ensures a complete 360° seal between the endform and the connector body.

What is claimed is:

1. A method for making a fluid coupling between first and second fluid carrying components, the method comprising the steps of:

forming an open ended, annular recess, including a radially inner recess surface, a radially outer recess surface and an inner end wall, in one end of the first component;

placing a bond material spin weld compatible with the materials forming the first and second components on at least the radially inner recess surface and the radially outer surface of the first component;

inserting an end of the second component into the recess in the first component; and spin welding the first and second components causing the bonding material to join the first component to the second component.

2. The method of claim 1 wherein the step of placing the bonding material in the recess in the first component comprises the step of:

double shot injection molding the bonding material in the first component.

3. The method of claim 1 wherein the step of placing the bonding material in the recess in the first component comprises the steps of:

inserting the bonding material in a loose state into the recess; and raising the temperature of the bonding material to a molten state during spin welding of the first and second components.

4. The method of claim 1 wherein the step of placing the bonding material in the recess in the first component comprises the steps of:

inserting the bonding material into the recess;

fixing the bonding material onto surfaces of the recess prior to insertion of the second component into the recess.

5. The method of claim 1 further comprising the step of:

selecting the bonding material from materials which are spin weld compatible with metal and plastic.

6. A fluid coupling comprising:

a first component having a bore extending from a first end;

a second component having a bore extending from a first end;

an open ended recess extending from the first end of the first component the recess, the recess including a radially inner recess surface, a radially outer recess surface and an inner end wall;

a spin weld inducing bonding material disposed in the recess on at least the radially inner recess surface and the radially outer recess surface of the first component prior to insertion of the first end of the second component into the recess; and the first end of the second component spin weld joined to the radially inner recess surface and the radially outer recess surface in the first component in the recess to the first component by the bonding material.

7. The fluid coupling of claim 6 wherein the spin weld inducing bond material is disposed on the inner end wall the second component is spin weld joined to the inner end wall of the recess by the bonding material.

\* \* \* \* \*